United States Patent [19]

Moorhead

[11] Patent Number: 4,489,516

[45] Date of Patent: Dec. 25, 1984

[54] SNAKE TRAP

[76] Inventor: Albert B. Moorhead, P.O. Box 413, Conroe, Tex. 77301

[21] Appl. No.: 430,662

[22] Filed: Sep. 30, 1982

Related U.S. Application Data

[63] Continuation-in-part of Ser. No. 128,399, Mar. 10, 1980, Pat. No. 4,370,823.

[51] Int. Cl.³ .............................................. A01K 69/02
[52] U.S. Cl. ............................................ 43/7; 43/10; 256/1; 256/23
[58] Field of Search ...................... 43/7, 10, 58, 64, 65, 43/100, 101, 121; 256/1, 23, 45; 47/20, 21, 26, 28 R, 31

[56] References Cited

U.S. PATENT DOCUMENTS

| | | | |
|---|---|---|---|
| 1,182,018 | 5/1916 | Koenig | 256/1 |
| 1,251,926 | 1/1918 | Schlesinger | 256/24 |
| 1,618,739 | 2/1927 | Wenzin | 256/1 |
| 1,703,372 | 2/1929 | Tilton | 256/24 |
| 2,766,016 | 10/1956 | Miller et al. | 256/1 |
| 3,273,862 | 9/1966 | Miller | 256/24 |
| 4,188,020 | 2/1980 | Herrig et al. | 256/45 |
| 4,209,153 | 6/1980 | Vanvlaenderen | 256/45 |
| 4,301,996 | 11/1981 | Holyoak | 256/45 |
| 4,366,949 | 1/1983 | Staub, Sr. | 256/1 |

*Primary Examiner*—Nicholas P. Godiel
*Assistant Examiner*—Kurt Rowan
*Attorney, Agent, or Firm*—Pravel, Gambrell, Hewitt & Kimball

[57] ABSTRACT

A device for the trapping of snakes and similar animals having an area of netting to be placed on the ground and releasably secured thereto and shaped such that a plurality of areas of the netting are substantially non-horizontal to the ground. A snake attempting to traverse the area of netting will pass into an interstice of the area of netting until its body size prevents forward motion. The scales of the snake will engage the strands of the netting preventing the snake from retreating from the netting and thus effectively trapping the snake.

11 Claims, 4 Drawing Figures

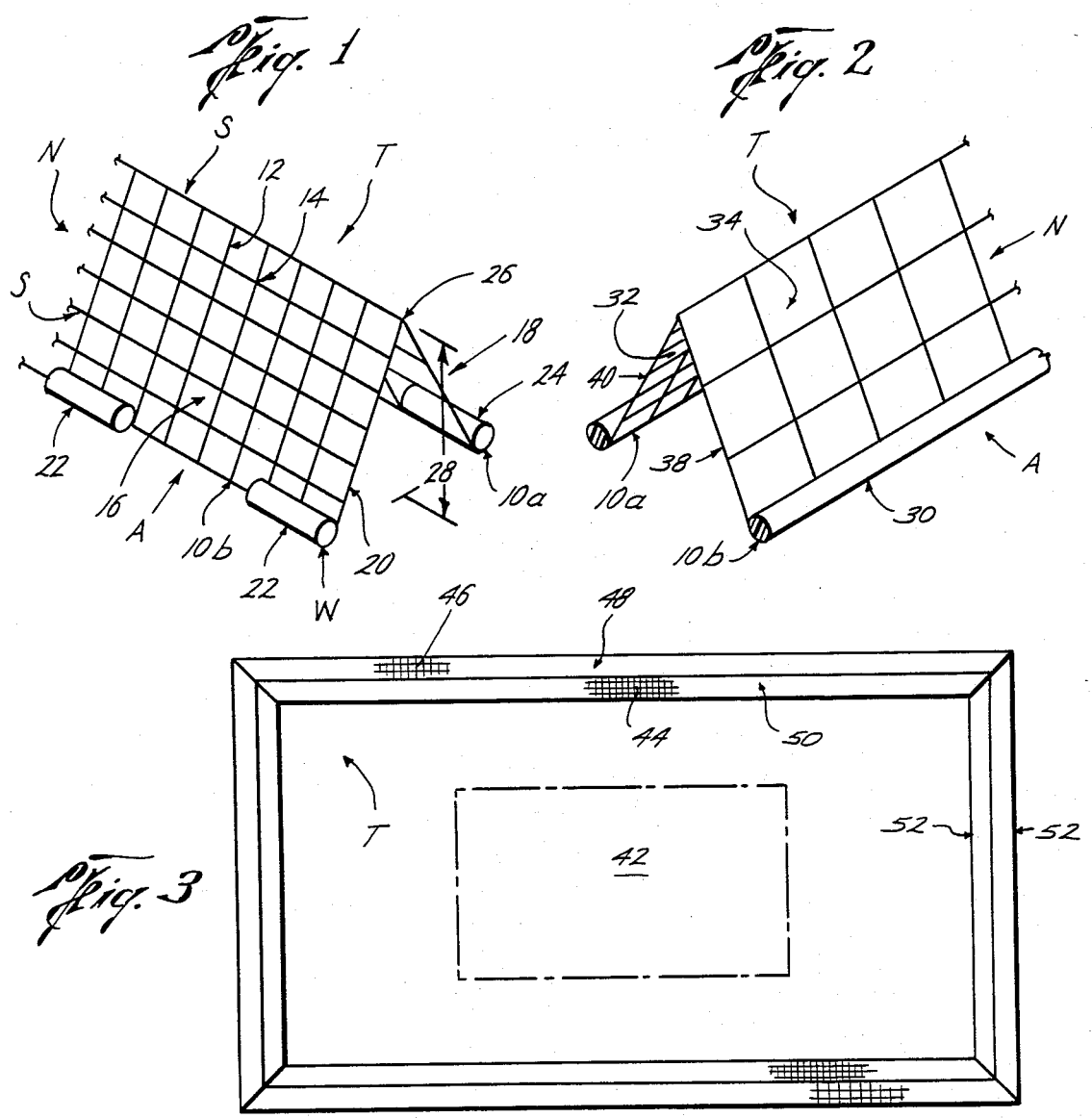
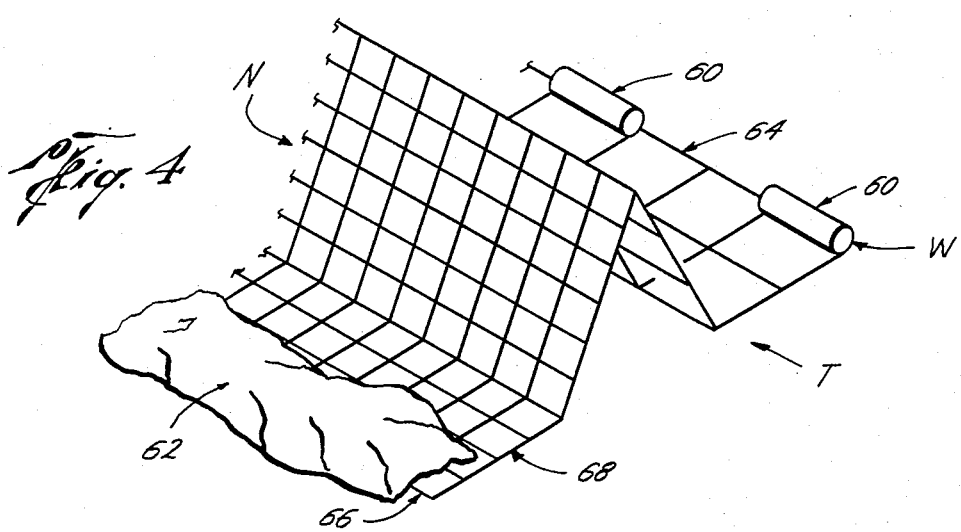

SNAKE TRAP

CROSS REFERENCES TO RELATED APPLICATIONS

This is a continuation-in-part of application Ser. No. 128,399, filed Mar. 10, 1980, now U.S. Pat. No. 4,370,823.

FIELD OF THE INVENTION

This invention pertains to devices for the trapping of snakes and other similar animals. More specifically, this invention pertains to devices for the trapping of snakes and other similar animals in the interstices of netting.

DESCRIPTION OF THE PRIOR ART

Traps using netting are well known in the art, as shown for example, in U.S. Pat. Nos. 82,913; 699,041 and 3,691,667. These traps, however, use the netting to form areas to control the movement of the animals rather than using the interstices of the netting itself to capture and hold the animal. Other patents such as U.S. Pat. No. 912,134 are for traps in which an animal may advance past a portion of the trap but then is trapped because it is unable to move further or to retreat. However, these do not disclose a netting as being the object through which the animal moves nor are they adapted for the physiology of a snake.

SUMMARY OF THE INVENTION

This invention is a device for the capturing of snakes and other similar animals in which an area of netting is placed on the ground and the netting is shaped so that there is a plurality of parts of the netting which are substantially non-horizontal to the ground. Weights, which can be preformed, are mounted on a portion or an edge of the netting to form a releasable anchor. A snake traversing the ground will pass into an interstice of the netting in at least one of the non-horizontal parts, proceed forward, perhaps moving through other interstices in other substantially non-horizontal parts of the netting, until the snake is no longer able to move forward because of an increase in body size in comparison to the interstices. When the snake attempts to retreat, the scales of the snake's body engage the strands of the netting preventing the snake from moving backwards and thereby trapping the snake.

BRIEF DESCRIPTION OF THE DRAWINGS

FIG. 1 is a perspective view of one embodiment of the invention showing the weights attached along the outside edges of the area of netting;

FIG. 2 is a perspective view of another embodiment of the invention showing the weights as continuous bars along the outside edges of the area of netting;

FIG. 3 is a schematic view showing the embodiment of the invention as a protective, closed perimeter; and, FIG. 4 is a perspective view of another embodiment of the invention showing the weights attached along one outside edge of the area of netting with the opposite outside edge secured by dirt or other suitable material.

DESCRIPTION OF THE PREFERRED EMBODIMENT

A preferred embodiment of the present invention is shown in FIG. 1. The snake trap of the present invention is designated in the drawings generally by the letter "T." The trap T of the present invention is formed by an area of netting N releasably secured to the ground or surface where such is placed with preformed weights W and configured such that sides S of the trap T are substantially non-horizontal to the ground.

The trap T includes an area of netting N formed by a plurality of strands 12. The strands 12 may be made of a number of materials such as wire or thread but are preferably formed of a polyethylene material or a nylon thread with a polyethylene coating. The strands 12 form the area of the netting N by being joined at the points of intersection 14 of the strands. The intersecting strands 12 may be joined by knotting or tying with other materials but are preferably sealed together or extruded as a unit by processes well known in the art. The shape of the net openings or interstices 16 may also vary but preferably are square or rectangular because of the simplicity of manufacture.

The material of the strands 12 preferably is such that the area of netting N may be folded to form various parts. As shown in FIG. 1, a first side 18 and second side 20 are formed by folding the area of netting N along fold 26. The fold 26 is shown as being formed by a crease along strands 12 but may be formed anywhere along the area of netting N so long as the trap T will retain the desired shape. One method of forming such sides 18, 20 and folds 26 in polyethylene material consists of folding, curving or bending the netting over a heated metal wire for a brief time then removing the netting, whereby the lines desired to divide the area are permanently creased into the netting.

The trap T further includes weights W, such as weights 22, 24. The weights 22, 24 may be preformed of any suitable material such as lead, cement or polyethylene material, and bonded or attached to the netting, removably or not, by means well known in the art. For example, small lead weights may be encased in a polyethylene material along the edges of a net made of the same polyethylene material, or small lead weights may be folded or crimped along the edges of the net.

In the use or operation of the embodiment of the present invention of FIG. 1, the area of netting N of the trap T is creased so that it forms sides 18 and 20, which is placed upon the ground with the outside edges 10a, 10b generally flat on the ground and sides 18 and 20 above and at an angle or non-horizontal relative to the ground and shaped to form an inverted "V." Preformed weights 22, 24 with the outside edges 10a, 10b of the netting sides 18, 20 releasably secure the area of netting N to the ground to permit limited transverse movement of the trap T after the snake has become entangled in the area of netting N, as will be more fully explained.

A snake (not shown) traversing the ground in the direction of arrow A and encountering the trap T will continue its forward movement by entering one of the openings or interstices 16 of the area of netting N. Since a snake's body size in cross-section increases from its head rearwardly along its length for a substantial distance, as the snake progresses, the portion of its body going through the interstices 16 becomes larger. If the snake is sufficiently large or the interstices 16 sufficiently small, at some point the snake will no longer be able to progress forward. Since the snake is thus caught or trapped in the forward direction, its instinct to escape causes it to try to move backwards or retreat. The snake upon moving backwards rubs its scales along the strands 12 of the area of netting N where upon the scales will become entangled with or engage the interstices 16 to lock the snake in position in the netting. The size of the snake in relation to the interstices 16 will prevent forward motion; the scales lapping over the strands 12 in response to the snake's efforts to move rearwardly will prevent backward motion.

The trap T is held in a releasably fixed manner to the ground by the weights W so that the area of netting N will, if the motion of the snake is sufficient, move transversely with the snake and further entangle the snake. If the area of netting N were immovably secured, it is possible that the force of the snake's struggling motion would tear the area of netting N or allow the snake to squeeze through the interstices 16.

Factors to be considered in determining the exact measurements of an embodiment relate to the type of snake or snakes to be caught. If the openings or interstices 16 of the area of netting N are so small that the snake cannot get its head and a portion of its body therethrough, the snake will be unable to enter any of the interstices 16 and therefore will be able to go over or around the trap T. If the openings or interstices 16 are so large that the snake can go therethrough without constraining the snake with the strands 12 within the opening it is passing through, the snake will be able to completely traverse the netting without becoming entangled therein. As most snakes travel with their heads slightly elevated, the height 28 of the trap T should be sufficiently high to prevent the snake from going over the trap T.

A second embodiment of the trap T of the present invention is shown in FIG. 2. In this embodiment, the weights W are formed as a continuous bar 30 with and along the outside edges 10a, 10b of the area of netting N. The bar 30 may be formed using a metal wire (not shown) that has a desired mass and flexibility. Also the bar 30 may be wire encased in plastic or, alternatively, may be formed of any other suitable material. FIG. 2 also shows the use of interstices 32, 34 of varying sizes on the opposites sides 38, 40 of the trap T. A snake traversing in the direction of arrow A will encounter the interstices 34 wherein a larger snake will be trapped. A smaller snake will traverse the side 38 of the area of netting N with larger interstices 34 and reach the opposite side 40 with the smaller interstices 32. Thereby, one trap T may be used to trap varying sizes of snakes. Further, it is likely that some snakes would be trapped in more than one part of the area of netting N. That is, for example, the snake's larger body portion may be trapped in the side 38 of the trap T with larger interstices and the smaller body portion may be trapped in the side 40 with smaller interstices.

FIG. 3 shows the trap T of the present invention utilized as a protective perimeter around an object 42, such as a sleeping bag, tent blueberry patch, garden, playground, field, or any object or area needing protection from snakes. This embodiment will exclude snakes from the region within the perimeter created by the trap T. The embodiment in FIG. 3 uses the larger interstices 46 on the outside perimeter 48 of the trap T and the smaller interstices 44 along the inside perimeter 50. The weights, though not shown, would be attached, affixed, or in some manner formed with the outside and inside edges 52 of the trap T.

The embodiment shown in FIG. 4 employs preformed weights 60 of the weights W attached along one outside edge 64 of the area of netting N. The opposite outside edge 66 is releasably secured to the ground by placing a suitable substance 62, such as dirt, sand, rocks, gravel, or the like on the part 68 of the area of netting N along the opposite outside edge 66 that lies on the ground.

The cross-sectional area of the trap T shown in FIG. 1, as seen from one end, shows an inverted "V" formed by sides 18 and 20. This shape is also shown in FIGS. 2 and 4. The cross-sectional shape may vary significantly as long as there is at least one area which is at an angle to the ground or is substantially non-horizontal so as to entrap snakes. In addition, the area of netting may be formed of more than one piece of netting, for example, two pieces having different sized interstices, so long as the pieces are connected together in the desired shape.

Because of the unique construction and light weight nature of the present invention, the snake trap T is well suited to be employed in camping situations in which the netting may be employed around a sleeping bag, or the front of a tent. This provides a measure of security for a person sleeping outdoors in an area where snakes are located. Also, the invention is useful for trapping snakes in yards, gardens, or fields to keep them from entering such regions, thereby reducing the danger of humans being attacked by snakes. Since the snakes are caught alive, a person may also use the traps of this invention for catching snakes for specimens, study or any other purpose.

The foregoing disclosure and description of the invention are illustrative and explanatory thereof and various changes in the size, shape and materials as well as the details of the illustrated construction may be made without departing from the spirit of the invention.

I claim:

1. A device for the trapping of snakes on the ground, comprising:

at least one area of netting;

said area of netting shaped so that when said area of netting is placed on the ground, a plurality of sides of said area of netting are substantially non-horizontal to the ground; and a plurality of preformed weights with said area of netting for releasably securing said area of netting to the ground to permit said area of netting to move transversely over the ground in response to a struggling force of a snake being trapped;

said area of netting is formed having outside edges; and said plurality of preformed weights are attached to said area of netting along said outside edges for placement on the ground.

2. The device of claim 1, wherein:

said preformed weights form substantially parallel bars along said outside edges of said area of netting.

3. The device of claim 1, wherein:

said area of netting is formed having a first outside edge and a second outside edge; and said preformed weights are attached along said first outside edge of said area of netting and the part of said area of netting along said second outside edge is adapted to be placed substantially flat on the ground.

4. The device of claim 1, wherein:

said interstices of said substantially non-horizontal sides of said area of netting vary in size between said non-horizontal sides.

5. The device of claim 1, wherein:

said area of netting in cross-section is formed substantially in the shape of an inverted "V".

6. A method for excluding snakes from a region comprising the steps of:

shaping an area of netting so that when said area of netting is placed on the ground a plurality of sides of said area of netting are substantially non-horizontal to the ground;

releasably securing the netting to the ground with weights mounted on the netting for placement on the ground so that the netting will move transversely over the ground in response to a struggling force of a snake being trapped; and, closing the perimeter of said region with said area of netting.

7. The method of claim 6, further including comprising the steps of:

forming said area of netting to have outside edges; and, attaching a plurality of preformed weights to said area of netting along said outside edges; and, forming said area of netting in cross-section into substantially the form of an inverted "V".

8. The method of claim 7, further including the step of:

forming said preformed weights into substantially parallel bars along said outside edges of said area of netting.

9. The method of claim 6, further including the steps of:

forming said area of netting to have a first outside edge and a second outside edge;

attaching preformed weights along said first outside edge of the area of netting; and placing the part of the area of netting along the second outside edge of the area of netting substantially flat on the ground.

10. The method of claim 6, further including the step of:

forming the interstices of the substantially non-horizontal sides of the area of netting to vary in size between the non-horizontal sides.

11. The method of claim 6, further including the step of:

forming said area of netting in cross-section into substantially the form of an inverted "V".

* * * * *